(12) United States Patent
Ki et al.

(10) Patent No.: US 11,704,058 B2
(45) Date of Patent: Jul. 18, 2023

(54) SYSTEMS AND METHODS FOR RESOURCE-BASED SCHEDULING OF COMMANDS

(71) Applicant: Samsung Electronics Co., Ltd., Suwon-si (KR)

(72) Inventors: Yang Seok Ki, Palo Alto, CA (US); Ilgu Hong, Santa Clara, CA (US)

(73) Assignee: Samsung Electronics Co., Ltd., Yongin-si (KR)

( * ) Notice: Subject to any disclaimer, the term of this patent is extended or adjusted under 35 U.S.C. 154(b) by 0 days.

(21) Appl. No.: 17/082,933

(22) Filed: Oct. 28, 2020

(65) Prior Publication Data

US 2022/0035565 A1    Feb. 3, 2022

Related U.S. Application Data

(60) Provisional application No. 63/057,771, filed on Jul. 28, 2020.

(51) Int. Cl.
*G06F 3/06* (2006.01)
(52) U.S. Cl.
CPC .......... *G06F 3/0659* (2013.01); *G06F 3/0604* (2013.01); *G06F 3/0679* (2013.01)
(58) Field of Classification Search
CPC .... G06F 3/0659; G06F 3/0604; G06F 3/0679; G06F 2209/5011; G06F 9/5061; G06F 9/4881; G06F 9/4837; G06F 9/5016; G06F 9/5022; G06F 9/5077; G06F 3/0631; G06F 2209/503
See application file for complete search history.

(56) References Cited

U.S. PATENT DOCUMENTS

| | | |
|---|---|---|
| 6,466,559 B1 | 10/2002 | Johansson et al. |
| 6,857,020 B1 | 2/2005 | Chaar et al. |
| 8,037,219 B2 | 10/2011 | Jibbe et al. |
| 8,145,785 B1 | 3/2012 | Finkelstein et al. |
| 8,966,490 B2 | 2/2015 | Avni et al. |

(Continued)

OTHER PUBLICATIONS

Wong, Theodore M., et al., "Zygaria: Storage performance as a managed resource," Proceedings of the 12th IEEE Real-Time and Embedded Technology and Applications Symposium, RTAS, 2006, 10 pages.

(Continued)

*Primary Examiner* — Charles Rones
*Assistant Examiner* — Tong B. Vo
(74) *Attorney, Agent, or Firm* — Lewis Roca Rothgerber Christie LLP

(57) ABSTRACT

A system and method for scheduling commands for processing by a storage device. A command is received from an application and stored in a first queue. Information is obtained on a first set of resources managed by the storage device. A second set of resources is synchronized based on the information on the first set of resources. The second set of resources is allocated into a first pool and a second pool. A condition of the second set of resources in the first pool is determined. One of the second set of resources in the first pool is allocated to the command based on a first determination of the condition, and one of the second set of resources in the second pool is allocated to the command based on a second determination of the condition.

18 Claims, 5 Drawing Sheets

(56) References Cited

U.S. PATENT DOCUMENTS

| | | |
|---|---|---|
| 9,397,944 B1 | 7/2016 | Hobbs et al. |
| 9,792,051 B2 | 10/2017 | Liu et al. |
| 2009/0320033 A1* | 12/2009 | Gokhale ............... G06F 16/285 718/103 |
| 2010/0146103 A1 | 6/2010 | Hisatomi et al. |
| 2011/0119328 A1* | 5/2011 | Simitci .................. G06F 9/505 709/224 |
| 2015/0095917 A1 | 4/2015 | Challenger et al. |
| 2016/0004438 A1* | 1/2016 | Moon .................... G06F 3/0631 711/103 |
| 2018/0067772 A1* | 3/2018 | Frandzel ............... G06F 3/0613 |
| 2018/0143855 A1 | 5/2018 | Kim et al. |
| 2018/0293185 A1 | 10/2018 | Vembu et al. |
| 2019/0114208 A1 | 4/2019 | Yabe |
| 2019/0215277 A1 | 7/2019 | Dhanoa |
| 2019/0220189 A1* | 7/2019 | Yang ...................... G06F 3/061 |
| 2019/0278523 A1 | 9/2019 | Benisty |
| 2019/0370073 A1* | 12/2019 | Behar .................... G06F 9/505 |
| 2020/0050366 A1* | 2/2020 | Bavishi ................ G06F 3/0656 |
| 2020/0089537 A1* | 3/2020 | Bahirat ................ G06F 3/0659 |
| 2020/0097183 A1 | 3/2020 | Rawal et al. |
| 2020/0104184 A1 | 4/2020 | Subramanian et al. |
| 2020/0127938 A1 | 4/2020 | Duarte et al. |
| 2020/0287837 A1 | 9/2020 | Meng et al. |
| 2020/0293465 A1 | 9/2020 | Yang et al. |
| 2020/0379684 A1 | 12/2020 | Subbarao et al. |
| 2021/0200703 A1* | 7/2021 | Simionescu ............ G06F 3/061 |
| 2021/0266253 A1 | 8/2021 | He et al. |
| 2021/0326169 A1* | 10/2021 | Chidambaram Nachiappan ......... G06F 9/4881 |
| 2021/0349657 A1* | 11/2021 | Darji ..................... G06F 3/0676 |
| 2021/0349749 A1* | 11/2021 | Guha .................... G06F 3/067 |
| 2022/0237133 A1* | 7/2022 | Simionescu .......... G06F 3/0685 |

OTHER PUBLICATIONS

U.S. Notice of Allowance dated Nov. 25, 2022, issued in U.S. Appl. No. 17/333,316 (10 pages).

Office Action for U.S. Application No. 17/333,316 dated May 11, 2022, 15 pages.

* cited by examiner

SYSTEMS AND METHODS FOR RESOURCE-BASED SCHEDULING OF COMMANDS

CROSS-REFERENCE TO RELATED APPLICATION(S)

The present application claims priority to and the benefit of U.S. Provisional Application No. 63/057,771, filed Jul. 28, 2020, entitled "RESOURCE-BASED SCHEDULING FOR QOS IN SSDS," the entire content of which is incorporated herein by reference.

FIELD

One or more aspects of embodiments according to the present disclosure relate to storage devices, and more particularly, to systems and methods for scheduling commands based on hardware resources of the storage devices.

BACKGROUND

A host computing device may provide commands (e.g. read and write commands) for processing by a storage device. The host computing device may have certain quality of service (QoS) expectations for the processing of the commands. In certain situations, however, there may not be enough hardware resources to process the commands in compliance with the QoS requirements, resulting in jitter.

Accordingly, there is a need for a system and method for scheduling commands for processing by a storage device, that considers availability of the hardware resources of the storage device for addressing QoS requirements.

SUMMARY

An embodiment of the present disclosure is directed to a method for scheduling commands for processing by a storage device. The method comprises receiving and storing a command from an application in a first queue; obtaining information on a first set of resources managed by the storage device; synchronizing a second set of resources based on the information on the first set of resources; allocating the second set of resources into a first pool and a second pool; determining a condition of the second set of resources in the first pool; allocating, to the command, one of the second set of resources in the first pool, based on a first determination of the condition; and allocating, to the command, one of the second set of resources in the second pool, based on a second determination of the condition. Based on the allocating of the one of the second set of resources, the command is stored in a second queue associated with the storage device for processing by the storage device.

According to one embodiment, the command includes a data operation from an application running on the host, and the processing of the command includes performing the data operation with respect to the non-volatile storage medium.

According to one embodiment, the information on the first set of resources includes availability of the first set of resources for processing the command.

According to one embodiment, the synchronizing of the second set of resources includes determining satisfaction of a criterion; determining a number of available first set of resources based on satisfaction of the criterion; and setting a number of available second set of resources to be equal to a number of available first set of resources.

According to one embodiment, the criterion comprises an expiration of a time period.

According to one embodiment, the first pool is shared by the first queue and a second queue, and the second pool is reserved for the first queue.

According to one embodiment, the second pool is dynamically determined based on a detected criterion. The detected criterion may comprise an identification of a quality of service requirement for the first queue.

According to one embodiment, the method for scheduling commands for processing by a storage device further comprises allocating, by the storage device, one of the first set of resources based on storing the command in the second queue; processing the command by the storage device; and deallocating the one of the first set of resources based on completion of the processing of the command.

According to one embodiment, the condition is availability of the second set of resources in the first pool.

An embodiment of the present disclosure is also directed to a system for scheduling commands for processing by a storage device. The system comprises a processor and a memory. The memory stores instructions that, when executed, cause the processor to: receive and store a command from an application in a first queue; obtain information on a first set of resources managed by the storage device; synchronize a second set of resources based on the information on the first set of resources; allocate the second set of resources into a first pool and a second pool; determine a condition of the second set of resources in the first pool; allocate, to the command, one of the second set of resources in the first pool, based on a first determination of the condition; and allocate, to the command, one of the second set of resources in the second pool, based on a second determination of the condition, wherein, based on the allocating of the one of the second set of resources, the command is stored in a second queue associated with the storage device for processing by the storage device.

These and other features, aspects and advantages of the embodiments of the present disclosure will be more fully understood when considered with respect to the following detailed description, appended claims, and accompanying drawings. Of course, the actual scope of the invention is defined by the appended claims.

BRIEF DESCRIPTION OF THE DRAWINGS

Non-limiting and non-exhaustive embodiments of the present embodiments are described with reference to the following figures, wherein like reference numerals refer to like parts throughout the various views unless otherwise specified.

DETAILED DESCRIPTION

Figure 1:
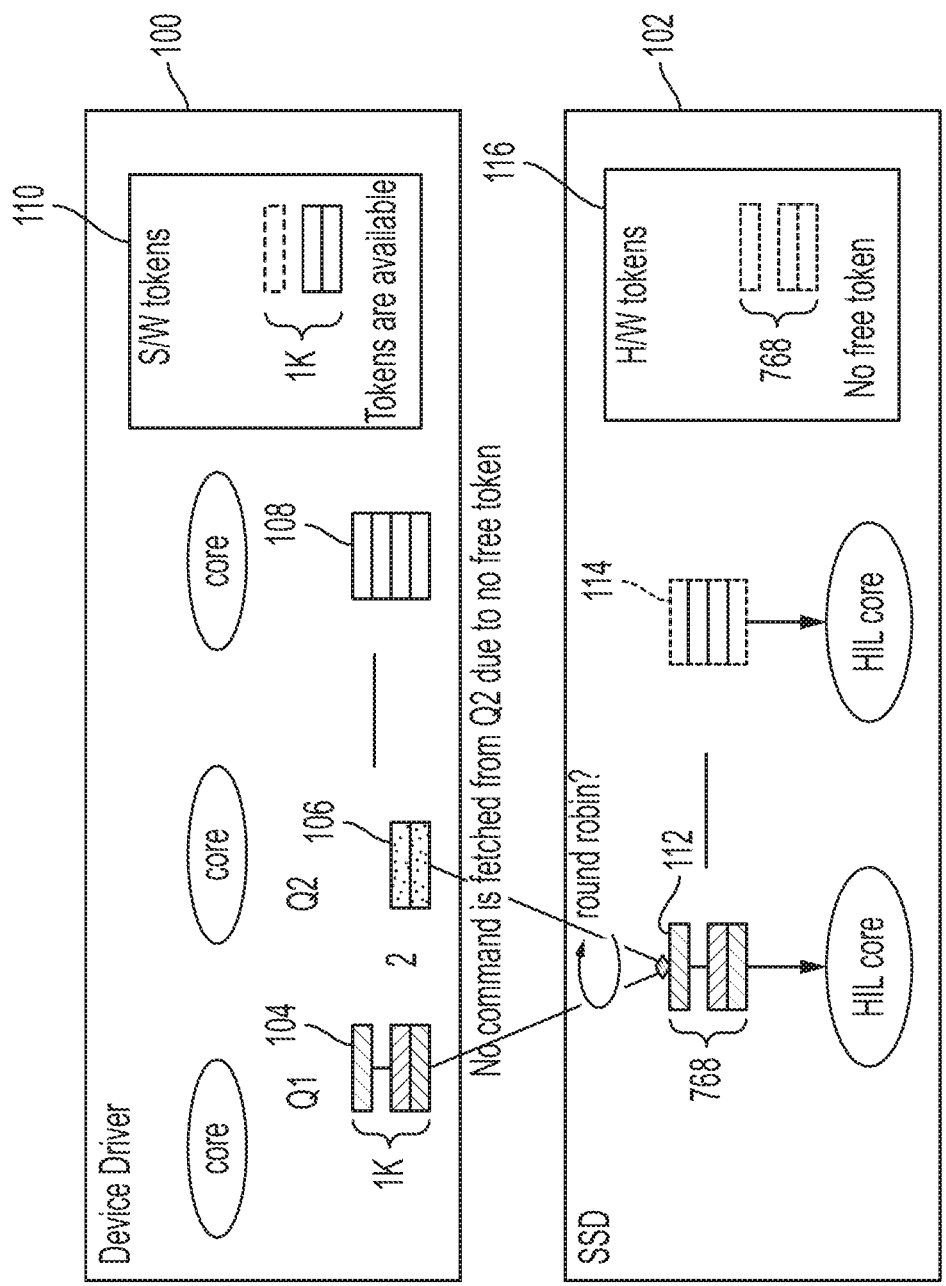
FIG. 1 is a conceptual block diagram of a system for scheduling commands according to current art mechanisms.

Hereinafter, example embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, descriptions thereof may not be repeated. Further, in the drawings, the relative sizes of elements, layers, and regions may be exaggerated and/or simplified for clarity.

Generally speaking, a storage device may have a limited number of hardware resources for processing commands from a host computing device. The hardware resources may be, for example, hardware queues and associated tokens that may be used for scheduling the commands for processing. The size of the hardware queues and associated number of tokens may be implementation specific, and may depend on the storage device's performance and QoS requirements.

A device driver interacting with the storage device may allocate software resources to the commands that are to be processed. The software resources may be, for example, software queues and associated tokens. The depth of the software queues and associated tokens may be arbitrary, and exceed the depth of the hardware queues and its associated tokens. This may sometimes result in the device driver scheduling more commands than the hardware resources available in the storage device. In such a situation, a command that is scheduled by the device driver, but that cannot consume a hardware resource, may experience delays in processing, resulting in high jitter.

FIG. 1 is a conceptual block diagram of a system for scheduling commands according to current art mechanisms. The system includes a device driver 100 configured to submit commands for processing by a storage device 102. The device driver 100 may include various software queues 104-108 for storing commands submitted by one or more applications of a host processing device. For example, queue 104 (Q1) may be a deep write queue configured to store write commands, while queue 106 (Q2) may be a shallow read queue configured to store read commands. The commands may consume software resources (e.g. software queues 104-108 and tokens 110), to deliver the commands to the storage device 102 for processing.

Similar to the device driver 100, the storage device 102 may include one or more hardware queues 112-114 configured to store the commands submitted by the device driver 100. For example, hardware queue 112 may be configured to store commands fetched from Q1 104 and Q2 106. The commands in the hardware queue 112 may consume hardware resources (e.g. hardware tokens) 116. The commands with assigned hardware resources 116 may be scheduled for processing by the storage device.

The various software queues 104-108 configured in the device driver may for addressing QoS provisions for the processing of the commands. For example, by separating write and read commands into separate queues 104, 106, and by employing a scheduling algorithm such as round robin, the read commands in Q2 may generally be serviced in a predictable time window. In some situations, however, although there are commands in Q2 that have been queued up with the expectation of being processed, resource conflicts within the storage device may prevent the servicing of the commands in Q2 as expected.

To illustrate this point, an example may be considered where Q1 104 has 1000 write commands queued up, and Q2 106 has 10 read commands queued up. It is assumed for purposes of this example that the 1000 write commands consumes 1000 software tokens 110, and may be submitted to the storage device for processing. According to this example, however, the storage device 102 only has 768 hardware tokens 116 to be assigned. Thus, the storage device 102 fetches up to 768 write commands from Q1 104 for processing, causing all 768 hardware tokens 116 to be consumed. Given that the write commands have consumed all the hardware tokens 116, with more write commands with software tokens 110 assigned that are left to be processed, the read commands in Q2 may be unable to be processed during their expected time window. Thus, the QoS requirements for Q2 may not be able to be satisfied.

Embodiments of the present disclosure are directed to a system and method for resource-based scheduling of commands that consider availability of the hardware resources of the storage device for submitting the commands for processing. According to one embodiment, hardware resources of a storage device are monitored for matching/synchronizing with the software resources. Once synchronized, the software resources may be assigned to commands as desired. The assigning of the software resources to the commands may be based on, for example, a determined QoS as set forth in a service level agreement (SLA). Although QoS is used as an example of a criteria that may be used to determine allocation of the software resources, a person of skill in the art should recognize that other criteria may also be considered, such as, for example, user preferences, and/or the like.

According to one embodiment, the device driver includes a software token manager configured to identify hardware resource information, and update the software resource information accordingly. In one embodiment, the software token manager updates a number of available software resources to match a number of available hardware resources. A certain portion of the available software resources may be reserved for one or more queues of the device driver based on, for example, QoS expectations. The remaining software resources may be part of a shared pool. In one embodiment, the software token manager assigns software tokens/resources from the shared pool, to commands in the software queues, for submitting the commands to the storage device for processing. According to one embodiment, if there are no software resources in the shared pool to be assigned to a command in a queue, the software token manager may access the software tokens reserved for the queue, and assign one of the reserved tokens to the command. The reserved tokens may allow commands to be processed in a timely manner for satisfying QoS requirements.

Figure 2:
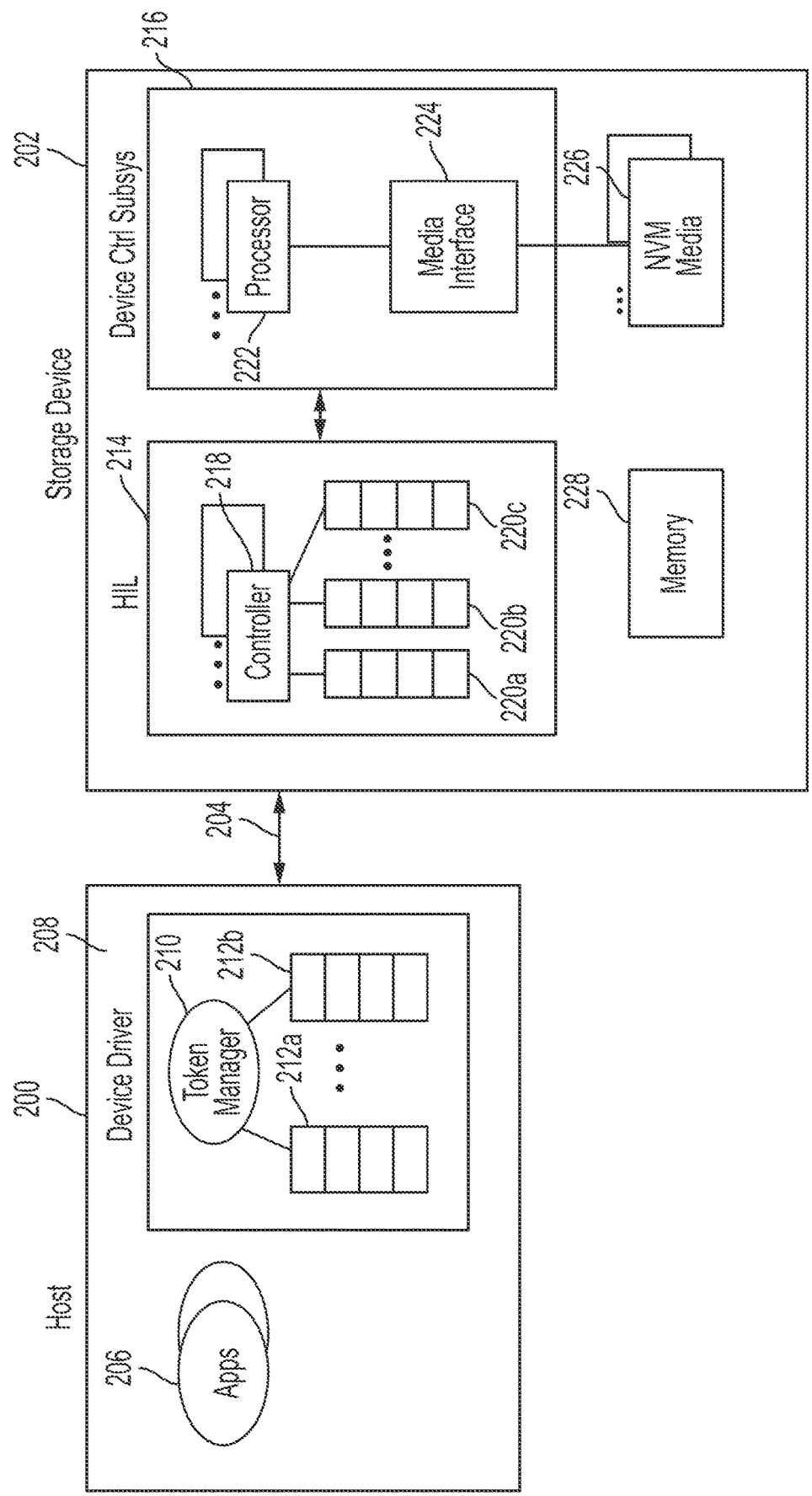
FIG. 2 is a block diagram of a system for resource-based scheduling of commands according to one embodiment.

FIG. 2 is a block diagram of a system for resource-based scheduling of commands according to one embodiment. The system may include a host computing device 200 coupled to a data storage device 202 over a storage interface bus 204. The storage device 202 may be a non-volatile storage device such as, for example, a solid state drive (SSD), an Ethernet SSD (eSSD), Universal Serial Bus (USB) drive, Security Digial (SD) Card, embedded Multi-Media Controller (eMMC), Universal Flash Storage (UFS), and/or the like. The storage interface bus 204 may be, for example, a Peripheral Component Interconnect Express (PCIe) bus, Ethernet, and CXL (Compute Express Link). In one embodiment, the host device 200 transfer and receive data to and from the data storage device 202 over the storage interface bus 204, using a storage interface protocol. The storage interface protocol may be, for example, a non-volatile memory express (NVMe) protocol or any other like protocol that uses queues for storing commands to be processed.

In one embodiment, the host 200 includes one or more applications 206 running in an application layer of the host 200. The one or more applications 206 may be software applications that are stored in host memory space for execution by a processor. In one embodiment, the one or more applications 206 may send commands to the storage device 202 for processing. For example, the one or more applications may issue read commands for reading data from the storage device, write commands for writing data into the storage device, and/or other input/output (I/O) requests.

In one embodiment, the host 200 includes a device driver 208 configured to interface with the storage device 202. In one embodiment, the device driver is implemented as software instructions that are stored in the host memory, and which are executed by the processor. The device driver 208 may include one or more queues 212a, 212b (hereinafter referred to as software queues 212). The software queues 212 may include, for example, one or more submission queues and completion queues. The submission queues may be configured to store commands/requests submitted by the various applications 206. The completion queues may be configured to store completion messages for the commands/requests processed by the by the storage device 202.

The one or more software queues 212 (e.g. submission queues) may be dedicated to store certain types of commands from the host 200. For example, one queue may be dedicated to store read commands from the applications, while another queue may be dedicated to store write commands. In one embodiment, certain QoS requirements may be imposed on the software queues 212 based on one or more SLAs. For example, a certain number of the commands in the software queues 212 may be expected to be processed in a given time period. Different QoS requirements may be associated with the different software queues 212.

The device driver 208 may further include a token manager 210 configured to manage software resources that many influence the scheduling of commands that are to be processed. The software resources may be, for example, software tokens and/or queues 212. In one embodiment, the token manager 210 is configured to determine availability of software tokens based on information from the storage device, and assign available tokens to commands stored in the software queues 212. The token manager 210 may be configured to maintain availability information on a per controller and/or token type basis. The assigned tokens may be from a shared pool when tokens are available in the shared pool, or from a pool that is reserved for a queue, for commands submitted to the queue.

In one embodiment, the storage device 202 includes a host interface layer (HIL) 214 for interfacing between the host 200 and a device control subsystem 216. The HIL 214 may include, without limitation, one or more controllers 218 and one or more queues 220a-220c (hereinafter referred to as hardware queues 220). The depth of the hardware queues 220 may depend, for example, on a processing power of the storage device. In one embodiment, different queues may be maintained for different types of processing by the storage device. For example, one hardware queue may store commands for processing by a hardware acceleration engine, and another queue may store commands for processing via firmware.

The controllers 218 may be implemented via one or more processors such as, for example, a field programmable gate array (FPGA) or an application specific integrated circuit (ASIC). One of the one or more controllers 218 may be associated with one or more hardware queues 220. The one of the controllers 218 may be configured to manage and assign hardware resources to commands submitted for processing in the software queues 212. The hardware resources may be, for example, hardware tokens and/or queues 220.

In one embodiment, the one or more controllers 218 are configured to fetch I/O requests/commands from one or more of the software queues 212, and store the fetched requests into the one or more of hardware queues 220 corresponding to the one or more controllers 218. In some embodiments, the requests may be fetched and submitted by the device driver 208.

The commands stored in the hardware queues 220 may be assigned hardware tokens for processing. In one embodiment, different types of hardware tokens may be maintained and assigned depending on the type and number of hardware queues 220. For example, a first type of hardware token may be assigned to a first hardware queue 220a dedicated for processing by a hardware acceleration engine, while a second type of hardware token may be assigned to a second hardware queue 220b dedicated for processing via firmware.

The number of available hardware tokens to be assigned to the commands in the different hardware queues 220 may depend on the number of commands already in the queues. In one embodiment, the tokens are assigned by the controller 218 based on hardware queue type. In one embodiment, hardware tokens are automatically assigned upon storing of commands in the one or more hardware queues 220. Commands that have assigned hardware tokens may be scheduled for processing by the device control subsystem 216.

In one embodiment, the device control subsystem 216 interacts with the controllers 218 for executing commands requested by the applications 206. The subsystem 216 may include, without limitation, one or more processors 222 and one or more media interface(s) 224. The one or more processors 222 may be configured to execute computer-readable instructions for processing commands to and from the controllers 218, and for managing operations of the storage device 202. The computer-readable instructions executed by the one or more processors 222 may be, for example, firmware code.

In one example, the one or more processors 222 may be configured to interact with the controllers 218 for receiving write or read commands to or from NVM media 226. The one or more processors 222 may interact with the NVM media 226 over the media interface 224 for effectuating the write or read actions. The NVM media 226 may include one or more types of non-volatile memory such as, for example, flash memory.

In one embodiment, the storage device 202 further includes an internal memory 228 for short-term storage or temporary memory during operation of the storage device 202. The internal memory 228 may include a DRAM (dynamic random access memory), SRAM (static random access memory), and/or DTCM (Data Tightly Coupled Memory). The internal memory 228 may be used to store, for example, the hardware queues 220.

Figure 3:
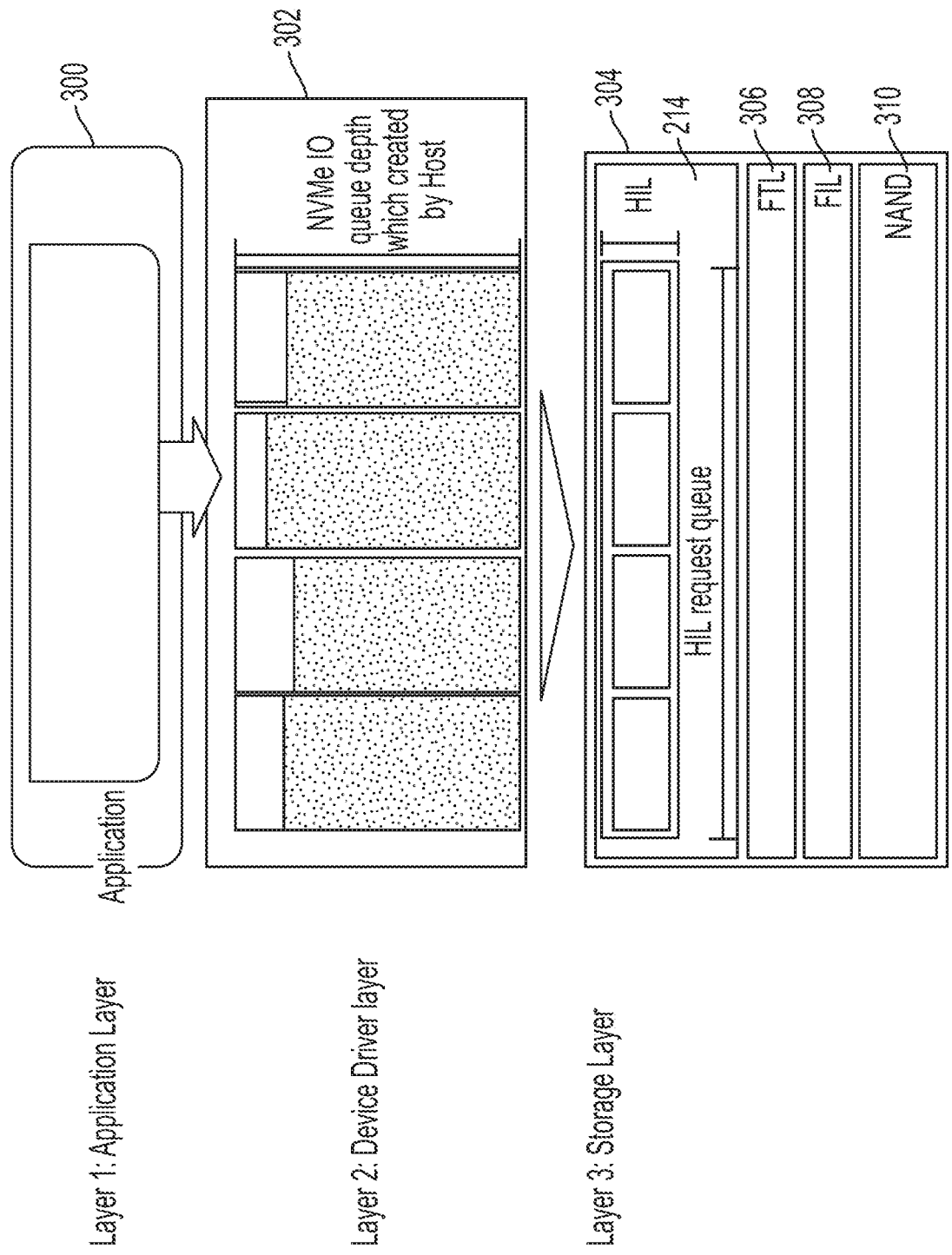
FIG. 3 is a block diagram of various abstraction layers of the system of FIG. 2 according to one embodiment.

FIG. 3 is a block diagram of various abstraction layers of the system of FIG. 2 according to one embodiment. The abstraction layers of the host 200 may include an application layer 300 and a device driver layer 302. The application layer 300 may be configured to generate commands based on I/O requests issued by the applications 206. The commands generated by the application layer 300 may confirm to the storage interface protocol of the storage interface bus 204 used for communicating with the storage device 202.

In one embodiment, the device driver layer 302 includes the software queues 212 and token manager 210. The commands generated by the application layer 300 are stored in the queues 212 in the device driver 208 based on, for example, the command type. The token manager 210 may determine availability of software tokens based on information from the storage device, and assign available tokens to commands stored in the software queues 212. In the event that all tokens are assigned, service may be rejected. In one embodiment, a command may be allowed to be queued in the software queues 212, but if no available tokens exist, the command may not be submitted to the hardware queues 220 for processing.

In one embodiment, the storage device 202 includes a storage layer 304 that may include various sublayers. The various sublayers may include the host interface layer 214 as well as other layers for interfacing with the NVM media 226 such as, for example, a flash translation layer 306 and flash interface layer 308. The NVM media 226 may be included in the storage layer 304 as flash media 310.

Figure 4:
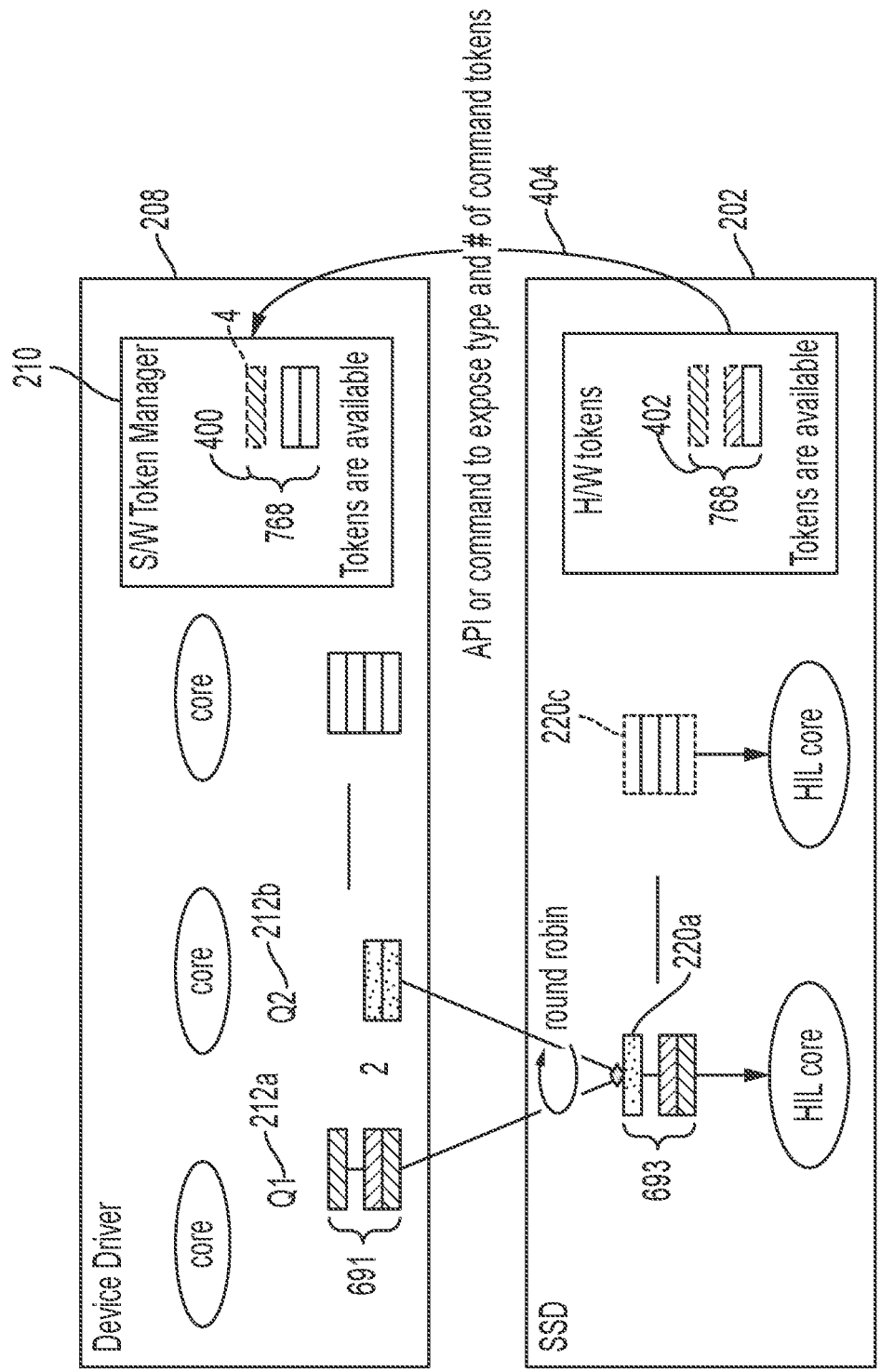
FIG. 4 is a conceptual block diagram of FIG. 2 for scheduling commands in first and second queues according to one embodiment.

FIG. 4 is a conceptual block diagram of FIG. 2 for scheduling commands in first and second queues according to one embodiment. The software token manager 210 may manage information on available software tokens 400, including information on a number of available software tokens in a shared pool, and information on a number of available software tokens in a reserved pool. In one embodiment, the token manager 210 maintains token availability information for the queues 112 managed by a controller of the various controllers 218 in the storage device 202. In the event that the storage device includes multiple controllers 218, the token manager 210 may maintain multiple sets of token availability information for the queues managed by the multiple controllers.

The token manager 210 may also maintain availability information for different types of tokens in a given set of available tokens. For example, different tokens may be assigned based on whether the command is to be processed by a hardware acceleration engine, or via firmware. The token manager 210 may be configured to monitor availability of tokens for hardware acceleration processing, and tokens for firmware processing, and assign an appropriate type of token to the command based on availability.

In one embodiment, a certain number of software tokens may be reserved in the reserved pool for each software queue 212. The reservation may also be based on different token types. The number of software tokens reserved for the software queues may be the same or different for the different queues and token types.

In one embodiment, the number of tokens reserved for a queue 212 (which should be understood to also include a token type) may be determined dynamically based on one or more criteria. The criteria may be, for example, usage statistics and/or SLA requirements. In one embodiment, the software token manager 210 is configured to identify the SLA requirements (e.g. required input/output per second, bandwidth, etc.) for a queue 212, and dedicate a portion of available software tokens 400 based on the SLA requirements. For example, if the bandwidth requirements for a queue is BW1, and a total available bandwidth is BW, a number of reserved tokens may be based on a ratio of BW1 to BW (BW1/BW).

In some embodiments, the software token manager 210 is configured to collect historical information relating to usage of the software queues, including time periods of the usage, amount of usage, applications responsible for the usage, and the like, and dynamically adjust the reserved number of tokens for the queues based on the historical information. In this manner, when a certain time period arrives when usage of one of the queues 212 is predicted to be high, the software token manager 210 may be configured to reserve more tokens for the queue based on the prediction.

In yet some embodiments, the software token manager 210 receives information from the various applications 206 as to a number and type of commands that are expected (e.g. in the next millisecond) from the applications. The software token manager 210 may dynamically adjust the number of reserved tokens for the affected queues, based on the information. For example, if a first queue is expected to be more highly utilized than a second queue, the number of reserved tokens for the first queue for a given time period may be proportionally higher than the number of reserved tokens for the second queue.

In one example, a total number of available software tokens 400 identified by the software manager 210 for a particular controller, at a given time window, is 768 tokens. The number of available software tokens 400 may match a total number of hardware tokens 402 associated with a particular controller 218. The software manager 210 may be configured to reserve a certain number of the available software tokens, in a reserved pool. For example, 10% of the available tokens (77 tokens) may be allocated into the reserved pool, while the remaining 691 tokens may be allocated to the shared pool. In the event that a first one of the software queues 212a (Q1) has 691 commands stored in the queue, and a second one of the software queues 212b (Q2) has two commands stored in the queue, the token manager 210 may be configured to schedule the commands in Q1 for processing based on a scheduling algorithm such as, for example, a scheduling algorithm such as round robin, weighted round robin, fixed priority, or the like. The commands in Q1 may be allocated the 691 available software tokens in the shared pool for allowing the commands to be submitted to the associated hardware queue 220a for processing. The 691 commands submitted to the hardware queue 220a may consume 691 hardware tokens from the pool of available hardware tokens 402.

The two commands in Q2 may be selected next for processing according to the scheduling algorithm. Assuming that the 691 tokens assigned to the command in Q1 have not yet been released, there are no more tokens in the shared pool to be assigned to the commands in Q2. However, given that 77 tokens have been allocated to the reserved pool, and divided amongst the various software queues 212, two of the software tokens in the reserved pool that have been allocated to Q2 are assigned to the two commands in Q2. In this regard, even though there are no more available software tokens in the shared pool, the two commands in Q2 may still be submitted to the corresponding hardware queue 220a for processing via the reserved software tokens, allowing fairness in scheduling to be maintained. The two commands submitted to the hardware queue may consume two tokens from the available hardware tokens, causing a total number of available hardware tokens 402 to decrease to 75.

In one embodiment, information on the updated hardware tokens is exposed to the token manager 210 via commands or via an application programming interface (API) 404. The information may then be used by the token manager 210 to synchronize its software tokens 400. Information on updated tokens may be pushed to the token manager 210, or fetched by the token manager from the storage device 202, on a periodic (regular or irregular) basis. For example, the controller 218 may submit a completion message to the device driver 208 using an interrupt signal, based on completing the processing of one or more commands by the processor 222, which in turn may deallocate/free-up one or more corresponding hardware tokens 402. The completion message may be transmitted to the token manager 210, and/or submitted to a completion queue of the one or more software queues 212. When submitted to the completion queue, the token manager 210 may be configured to periodically fetch completion messages from the completion queue, and update the available software tokens 400 accordingly. For example, when one or more completion messages associated with five processed commands are received by the token manager 210, the token manager may deallocate five corresponding software tokens previously allocated to the commands.

Figure 5:
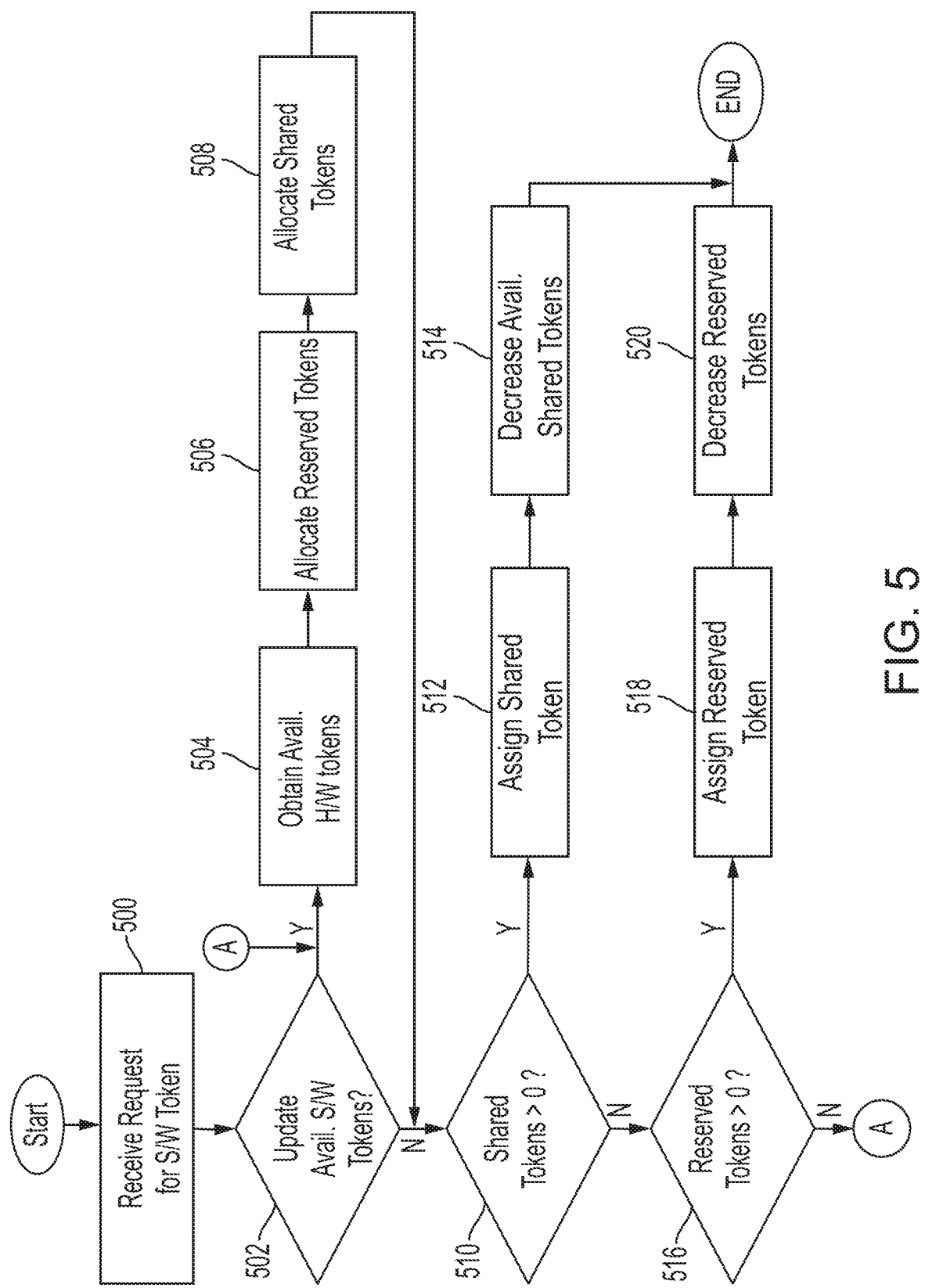
FIG. 5 is a flow diagram of a process for resource-based scheduling of commands stored in software queues according to one embodiment.

FIG. 5 is a flow diagram of a process for resource-based scheduling of commands stored in the software queues 212 according to one embodiment. It should be understood that the sequence of steps of the process is not fixed, but can be altered into any desired sequence as recognized by a person of skill in the art.

The process starts, and at block 500, the token manager 210 receives a request for a software token for a command in one of the software queues 212. In some embodiments, a placement of a command in the queue may be deemed to be a request for a software token. The request may include an identifier of the queue storing the command, and a token type.

At block 502, the token manager 210 determines whether information on available software tokens should be updated. Software tokens may be updated upon satisfaction of a criterion, such as, for example, expiration of a time period, or upon determination that there are no available software tokens in the shared and reserved pools when the request is received.

If the token availability information is to be updated, the token manager 210 obtains, in act 504, information on the available hardware tokens, and synchronizes the available software tokens to match the available hardware tokens. This may include, for example, receiving an interrupt signal from the one or more controllers 218 for receiving the update information, or querying one or more completion queues for information on completed commands by the storage device 202. In one embodiment, the update information may include token type information for allowing the token manager 210 to synchronize a number of available software tokens on a per token type basis.

At block 506, the token manager 210 reserves a certain number of the available tokens per queue, and per token type. For example, assuming that the total number of available tokens is 1000, the token manager 210 may allocate 10% of the available tokens to a first one of the queues, and 5% of the available tokens to a second one of the queues. The percentages may be static (e.g. manually set), or determined dynamically. Other percentages are also possible. The number of reserved tokens may be based, for example, on expected usage of the queue and/or queue type, QoS expectations, and/or the like.

At block 508, remaining available tokens are allocated as shared tokens in a shared pool.

At block 510, a determination is made as to whether shared tokens in the shared pool satisfy a condition. The condition may be, for example, availability of shared tokens to be allocated to the command. If the answer is YES, an available token in the shared pool is allocated to the command at block 512. The command may now be submitted/fetched by the controller 218 for processing, causing consumption of a hardware token.

At block 514, the token manager 210 decreases the number of available software tokens in the shared pool by one.

Referring again to block 510, if a determination is made that the shared tokens do not satisfy the condition (e.g. there are no shared tokens in the shared pool), the token manager 210 determines, in block 516 whether there are any reserved tokens for the queue and token type associated with the command. If the answer is YES, an available token in the reserved pool for the queue and token type is allocated to the command at block 518.

At block 520, the token manager decreases the number of reserved tokens for the queue and token type, by one.

If there are no shared or reserved tokens to be assigned to the command, the command may remain in the queue without being serviced, until software tokens become available again.

In some embodiments, the systems and method for resource-based scheduling of command discussed above, are implemented in one or more processors. The term processor may refer to one or more processors and/or one or more processing cores. The one or more processors may be hosted in a single device or distributed over multiple devices (e.g. over a cloud system). A processor may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processor, as used herein, each function is performed either by hardware configured, i.e., hard-wired, to perform that function, or by more general-purpose hardware, such as a CPU, configured to execute instructions stored in a non-transitory storage medium (e.g. memory). A processor may be fabricated on a single printed circuit board (PCB) or distributed over several interconnected PCBs. A processor may contain other processing circuits; for example, a processing circuit may include two processing circuits, an FPGA and a CPU, interconnected on a PCB.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the spirit and scope of the inventive concept.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present disclosure". Also, the term "exemplary" is intended to refer to an example or illustration. As used herein, the terms "use," "using," and "used" may be considered synonymous with the terms "utilize," "utilizing," and "utilized," respectively.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein.

Although exemplary embodiments of a system and method for resource-based scheduling of commands have been specifically described and illustrated herein, many modifications and variations will be apparent to those skilled in the art. Accordingly, it is to be understood that a system and method for resource-based scheduling of commands constructed according to principles of this disclosure may be embodied other than as specifically described herein. The disclosure is also defined in the following claims, and equivalents thereof.

What is claimed is:

1. A method for scheduling commands for processing by a storage device, the method comprising:
   receiving and storing a command from an application in a first queue;
   obtaining information on a first set of resources managed by the storage device;
   updating a second set of resources based on the information on the first set of resources;
   allocating the second set of resources into a first pool and a second pool, wherein the first pool is shared by the first queue and a second queue, and at least a first portion of the second pool is reserved for the first queue, and a second portion of the second pool is reserved for the second queue;
   determining a number of the second set of resources in the first pool;
   allocating, to the command, one of the second set of resources in the first pool, based on the number of the second set of resources in the first pool being greater than zero, wherein the second pool is available for the first queue, wherein, based on the allocating of the one of the second set of resources in the first pool, the command is stored in a hardware queue associated with the storage device for processing by the storage device; and
   based on the number of the second set of resources in the first pool being zero, the first portion of the second pool reserved to the first queue being zero, and the second portion of the second pool reserved for the second queue being greater than zero, maintaining the command in the first queue.

2. The method of claim 1, wherein the command includes a data operation from the application running on a host, wherein the method further comprises processing the command by the storage device, wherein the processing includes performing the data operation with respect to a non-volatile storage medium.

3. The method of claim 1, wherein the information on the first set of resources includes an availability of the first set of resources for processing the command.

4. The method of claim 1, wherein the updating of the second set of resources includes:
   determining satisfaction of a criterion;
   determining a number of available resources in the first set of resources based on the satisfaction of the criterion; and
   setting a number of available resources in the second set of resources to be equal to the number of available resources in the first set of resources.

5. The method of claim 4, wherein the criterion comprises an expiration of a time period.

6. The method of claim 1, wherein the second portion of the second pool is reserved for the first queue.

7. The method of claim 6, wherein the second pool is dynamically determined based on a detected criterion.

8. The method of claim 7, wherein the detected criterion comprises an identification of a quality of service requirement for the first queue.

9. The method of claim 1 further comprising:
   allocating, by the storage device, one of the first set of resources based on storing the command in the hardware queue;
   processing the command by the storage device; and
   deallocating the one of the first set of resources based on completion of the processing of the command.

10. A system for scheduling commands for processing by a storage device, the system comprising:
    a processor; and
    a memory, wherein the memory stores instructions that, when executed, cause the processor to:
       receive and store a command from an application in a first queue;
       obtain information on a first set of resources managed by the storage device;
       update a second set of resources based on the information on the first set of resources;
       allocate the second set of resources into a first pool and a second pool, wherein the first pool is shared by the first queue and a second queue, and at least a first portion of the second pool is reserved for the first queue, and a second portion of the second pool is reserved for the second queue;

determine a number of the second set of resources in the first pool;

allocate, to the command, one of the second set of resources in the first pool, based on the number of the second set of resources in the first pool being greater than zero, wherein the second pool is available for the first queue, wherein, based on the allocating of the one of the second set of resources, the command is stored in a hardware queue associated with the storage device for processing by the storage device; and based on the number of the second set of resources in the first pool being zero, the first portion of the second pool reserved to the first queue being zero, and the second portion of the second pool reserved for the second queue being greater than zero, maintaining the command in the first queue.

11. The system of claim 10, wherein the command includes a data operation from the application running on a host, and the storage device is configured to engage in processing of the command, wherein the processing includes performing the data operation with respect to a non-volatile storage medium.

12. The system of claim 10, wherein the information on the first set of resources includes an availability of the first set of resources for processing the command.

13. The system of claim 10, wherein the instructions that cause the processor to update the second set of resources include instructions that cause the processor to:

determine satisfaction of a criterion;

determine a number of available resources in the first set of resources based on the satisfaction of the criterion; and set a number of available resources in the second set of resources to be equal to the number of available resources in the first set of resources.

14. The system of claim 13, wherein the criterion comprises an expiration of a time period.

15. The system of claim 10, wherein the second portion of the second pool is reserved for the first queue.

16. The system of claim 15, wherein the second pool is dynamically determined based on a detected criterion.

17. The system of claim 16, wherein the detected criterion comprises an identification of a quality of service requirement for the first queue.

18. The system of claim 10, wherein the storage device is configured to:

allocate one of the first set of resources based on storing the command in the hardware queue;

process the command; and transmit a signal for deallocating the one of the first set of resources based on completion of the processing of the command.

\* \* \* \* \*